(12) United States Patent
Liebscher et al.

(10) Patent No.: US 10,457,414 B2
(45) Date of Patent: Oct. 29, 2019

(54) REDUCED ELECTROMAGNETIC SIGNATURE OF CONFORMING CONICAL SEAL FASTENER SYSTEMS

(71) Applicant: ARCONIC INC., Pittsburgh, PA (US)

(72) Inventors: Andreas Liebscher, San Diego, CA (US); Wudhidham Prachumsri, Torrance (CA); Curtis Lea, Oro Valley, AZ (US); Luke Haylock, Culver City, CA (US)

(73) Assignee: Arconic Inc., Pittsburgh, PA (US)

( * ) Notice: Subject to any disclaimer, the term of this patent is extended or adjusted under 35 U.S.C. 154(b) by 199 days.

(21) Appl. No.: 15/836,296

(22) Filed: Dec. 8, 2017

(65) Prior Publication Data

US 2018/0162551 A1  Jun. 14, 2018

Related U.S. Application Data

(60) Provisional application No. 62/433,545, filed on Dec. 13, 2016.

(51) Int. Cl.
*F16B 5/06* (2006.01)
*B64D 45/02* (2006.01)
(Continued)

(52) U.S. Cl.
CPC ............ *B64D 45/02* (2013.01); *F16B 5/0642* (2013.01); *F16B 35/06* (2013.01); *F16B 43/001* (2013.01);
(Continued)

(58) Field of Classification Search
CPC .... F16B 5/0642; F16B 13/061; F16B 13/122; F16B 13/124; F16B 13/128;
(Continued)

(56) References Cited

U.S. PATENT DOCUMENTS 1,868,415 A  7/1932  Gundersen et al.
2,353,531 A *  7/1944  Whitney ............. F16B 23/0092
411/410
(Continued)

FOREIGN PATENT DOCUMENTS

CN  203297273  11/2013
CN  105422578  3/2016
(Continued)

OTHER PUBLICATIONS

International Search Report and Written Opinion issued in International Patent Application No. PCT/US2010/053342 entitled "Enhanced Conductivity Sleeved Fastener and Method for Making Same" (11 page).
(Continued)

*Primary Examiner* — Roberta S Delisle
(74) *Attorney, Agent, or Firm* — Greenberg Traurig, LLP

(57) ABSTRACT

A fastener including a sleeve having an elongated portion, a head with a bearing surface, and an internal threaded portion, a core bolt disposed within the sleeve and having a head and a shank portion having an external threaded portion engageable threadedly with the threaded portion of the sleeve. An insert is disposed within the sleeve and surrounds a portion of the core bolt. A seal element is attached to the sleeve and juxtaposed with the bearing surface of the head of the sleeve. The fastener is adapted to be installed in a structure. The electrical contact of the fastener reduces the potential difference between it and the structure, which provides a direct path for continuous propagation of electromagnetic waves, reducing electromagnetic wave scattering and minimizing the electromagnetic signature.

29 Claims, 8 Drawing Sheets

(51) Int. Cl.
*F16B 43/00* (2006.01)
*F16B 35/06* (2006.01)
*F16B 33/00* (2006.01)
*F16B 1/00* (2006.01)
*B64C 1/00* (2006.01)

(52) U.S. Cl.
CPC ......... *B64C 2001/0072* (2013.01); *F16B 5/06* (2013.01); *F16B 33/004* (2013.01); *F16B 2001/0064* (2013.01)

(58) Field of Classification Search
CPC .... F16B 19/1054; F16B 33/004; F16B 35/06; F16B 43/001; F16B 2001/0064; F16B 5/06
USPC ......... 411/34, 39–41, 43, 80.6, 371.1, 371.2, 411/542
See application file for complete search history.

(56) References Cited

U.S. PATENT DOCUMENTS

| | | | |
|---|---|---|---|
| 2,396,661 A | 3/1946 | Keller et al. | |
| 2,501,567 A | 3/1950 | Huck | |
| 2,940,767 A | 6/1960 | Quayle | |
| 3,041,912 A | 7/1962 | Kreider et al. | |
| 3,215,024 A | 11/1965 | Brilmyer et al. | |
| 3,239,036 A | 3/1966 | Scott | |
| 3,271,058 A | 9/1966 | Anderson | |
| 3,304,109 A | 2/1967 | Schuster | |
| 3,464,306 A * | 9/1969 | Orloff | B21J 15/022 411/361 |
| 3,535,911 A | 10/1970 | Armstrong et al. | |
| 3,606,357 A | 9/1971 | Yonkers | |
| 3,788,185 A | 1/1974 | Gutshall | |
| 3,792,933 A | 2/1974 | Stencel | |
| 3,820,297 A | 6/1974 | Hurd | |
| 3,835,615 A | 9/1974 | King, Jr. | |
| 3,915,052 A | 10/1975 | Ruhl | |
| 3,949,535 A | 4/1976 | King, Jr. | |
| 3,953,906 A | 5/1976 | Brown | |
| 3,965,792 A | 6/1976 | King, Jr. | |
| 4,048,898 A | 9/1977 | Salter | |
| 4,102,030 A | 7/1978 | King, Jr. | |
| 4,114,505 A | 9/1978 | Loeser et al. | |
| 4,164,807 A | 8/1979 | King, Jr. | |
| 4,164,971 A | 8/1979 | Strand | |
| 4,244,661 A | 1/1981 | Dervy | |
| 4,405,256 A | 9/1983 | King, Jr. | |
| 4,472,097 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,628,402 A | 12/1986 | Covery | |
| 4,702,655 A | 10/1987 | Kendall | |
| 4,755,904 A | 7/1988 | Brick | |
| 4,760,493 A | 7/1988 | Pearson | |
| 4,789,283 A | 12/1988 | Crawford | |
| 4,813,834 A | 3/1989 | Smith | |
| 4,850,771 A | 7/1989 | Hurd | |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,165,882 A * | 11/1992 | Shimizu | F04B 39/121 411/136 |
| 5,176,481 A | 1/1993 | Schiefer | |
| 5,391,028 A | 2/1995 | Charles | |
| D372,857 S | 8/1996 | Hirai | |
| 6,036,418 A * | 3/2000 | Stencel | F16B 19/1063 411/38 |
| 6,149,363 A | 11/2000 | March | |
| 6,213,699 B1 | 4/2001 | Sadri et al. | |
| 6,315,485 B1 | 11/2001 | Speck et al. | |
| 6,499,926 B2 | 12/2002 | Keener | |
| 6,537,005 B1 * | 3/2003 | Denham | F16B 19/1054 411/34 |
| 6,589,918 B2 | 7/2003 | Denpo et al. | |
| 6,659,699 B2 | 12/2003 | Stoewer et al. | |
| 6,665,922 B2 | 12/2003 | Schultz | |
| 7,038,920 B2 | 5/2006 | Banyai et al. | |
| 7,050,286 B2 | 5/2006 | Pridham et al. | |
| 7,160,630 B2 | 1/2007 | Klos | |
| 7,236,343 B2 | 6/2007 | Heidlebaugh et al. | |
| 7,277,266 B1 | 10/2007 | Le et al. | |
| 7,307,825 B2 | 12/2007 | De La Fuente De Anna et al. | |
| 7,308,842 B2 | 12/2007 | Hufnagl et al. | |
| 7,326,015 B2 | 2/2008 | Reynolds, Jr. | |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,740,433 B2 | 6/2010 | Miyoshi et al. | |
| 7,755,876 B2 | 7/2010 | Morrill et al. | |
| 7,869,181 B2 | 1/2011 | Le | |
| 7,898,785 B2 | 3/2011 | Winter et al. | |
| 7,969,706 B2 | 6/2011 | Heeter et al. | |
| 8,312,606 B2 | 11/2012 | Reid et al. | |
| 8,475,102 B2 * | 7/2013 | Haylock | B64D 45/02 411/361 |
| 8,506,224 B2 | 8/2013 | Cosenza et al. | |
| 8,573,910 B2 | 11/2013 | March et al. | |
| 8,636,455 B2 | 1/2014 | Wehrmeister et al. | |
| 8,647,035 B2 | 2/2014 | Bakken et al. | |
| 8,777,533 B2 * | 7/2014 | Hufnagl | F16B 19/1072 411/55 |
| 8,979,453 B2 * | 3/2015 | Hufnagl | F16B 19/1072 411/34 |
| 9,123,998 B1 | 9/2015 | LoRe | |
| 2002/0119028 A1 | 8/2002 | Brown et al. | |
| 2004/0091331 A1 | 5/2004 | Schultz | |
| 2005/0123373 A1 | 6/2005 | Hufnagl et al. | |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2007/0258182 A1 | 11/2007 | Morrill et al. | |
| 2008/0075555 A1 | 3/2008 | March | |
| 2008/0240925 A1 | 10/2008 | Kita et al. | |
| 2009/0053006 A1 | 2/2009 | Hufnagl et al. | |
| 2009/0060666 A1 | 3/2009 | Georgeson et al. | |
| 2009/0159306 A1 | 6/2009 | Loche et al. | |
| 2009/0178262 A1 | 7/2009 | Reid et al. | |
| 2010/0124472 A1 | 5/2010 | Nguyen et al. | |
| 2010/0219287 A1 | 9/2010 | Sanchez-Brunete Alvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2010/0278616 A1 | 11/2010 | March | |
| 2011/0056718 A1 | 3/2011 | Gattus et al. | |
| 2013/0004261 A1 | 1/2013 | Pattinson et al. | |
| 2014/0044498 A1 * | 2/2014 | Hufnagl | F16B 19/1054 411/43 |
| 2014/0056664 A1 | 2/2014 | March | |
| 2014/0230228 A1 | 8/2014 | Whitlock | |
| 2014/0338179 A1 | 11/2014 | Whitlock et al. | |
| 2016/0076575 A1 | 3/2016 | Kamal et al. | |
| 2016/0215804 A1 | 7/2016 | Hugnagl et al. | |
| 2016/0281760 A1 | 9/2016 | Kamal et al. | |

FOREIGN PATENT DOCUMENTS

| | | |
|---|---|---|
| DE | 20210801 | 10/2002 |
| DE | 102010009901 | 9/2011 |
| DE | 102013000308 | 7/2014 |
| EP | 0217312 | 4/1987 |
| EP | 0248122 | 12/1987 |
| EP | 0468563 | 1/1992 |

(56) References Cited

FOREIGN PATENT DOCUMENTS

| EP | 2471712 | 7/2012 |
|----|---------|--------|
| EP | 2615314 | 7/2013 |
| EP | 2805889 | 11/2014 |
| FR | 2165404 | 8/1973 |
| GB | 2212580 | 7/1989 |
| JP | 7151111 | 12/1996 |
| JP | 2010133446 | 6/2010 |
| WO | 8705976 | 10/1987 |
| WO | 2009/063060 | 5/2009 |

OTHER PUBLICATIONS

International Search Report and Written Opinion issued in International Application No. PCT/US07/78775, dated Oct. 22, 2008 (7 pages).

International Search Report and Written Opinion issued in International Patent Application No. PCT/US2010/029758, dated Sep. 7, 2010 (11 pages).

International Search Report and Written Opinion dated Dec. 14, 2015, issued by the European Patent Office in (PCT) International Application No. PCT/US2015/050105 (11 pages).

International Search Report and Written Opinion dated Oct. 19, 2016, issued by the European Patent Office in (PCT) Application International No. PCT/US2016/037610 filed Jun. 15, 2016 (12 pages).

Notice of Opposition of European Patent Application No. 07116776, including English-language translation, filed Jan. 6, 2012.

ASTM International, "Standard Guide for Measuring and Reporting Friction Coefficients", Nov. 2008, pp. 1-12.

Huck International, Inc., "Huck Aerospace Fasteners for Composite Structure", copyright 1992.

Guide d'emploi des traitements de surfaces appliques aux problemes de frottement, including its English-language translation, copyright Technique and Documentation, 2000.

Huck Manufacturing Company, "Lightweight (GP) Interference Fit Fastener for Composite Materials", Apr. 1984.

Military Specification, Lubricant, Solid Film, Heat Cured, Corrosion Inhibiting, Nato Code No. 2-1738, MIL-L-8937D, Mar. 29, 1982 Superseding MIL-L-8937C, Mar. 18, 1976.

Qu, Jun et al., "Friction and Wear and Titanium Alloys Sliding Against Metal, Polymer, and Ceramic Counterfaces", Oak Ridge Laboratory, Metals and Ceramics Division, Nov. 11, 2004.

Wielaba, Wojciech, "The Statistical Correlation of the Coefficient of Friction and Wear Rate of PTFE Composites with Steel Counterface Roughness and Hardness", Wrocklow University of Technology, Department of Mechanical Engineering (2002).

International Search Report & Written Opinion dated Feb. 21, 2018, issued by the Korean Intellectual Property Office in International Application No. PCT/US2017/065356 filed Dec. 8, 2017.

\* cited by examiner

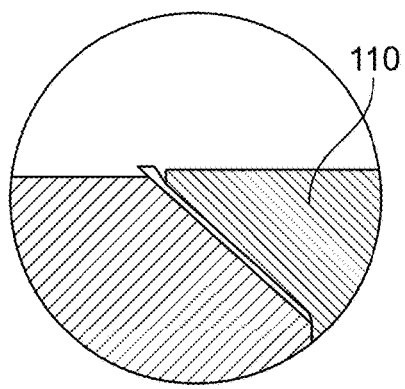
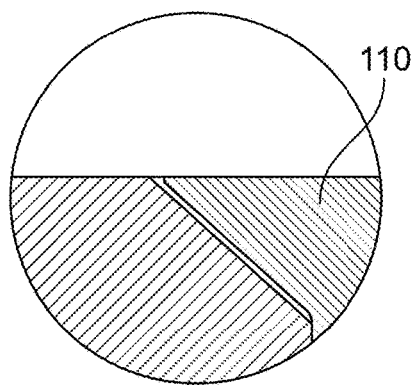
FIG. 12A                FIG. 12B
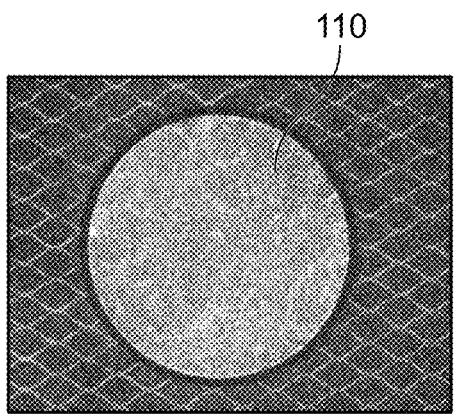
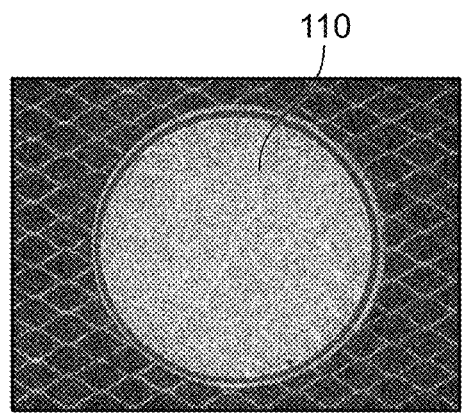
FIG. 13                 FIG. 14

REDUCED ELECTROMAGNETIC SIGNATURE OF CONFORMING CONICAL SEAL FASTENER SYSTEMS

CROSS-REFERENCE TO RELATED APPLICATION

This application is a Section 111(a) application relating to and claiming the benefit of commonly-owned, U.S. Provisional Patent Application Ser. No. 62/433,545, filed Dec. 13, 2016, entitled "REDUCED ELECTROMAGNETIC SIGNATURE OF CONFORMING CONICAL SEAL FASTENER SYSTEMS," which is incorporated herein by reference in its entirety.

FIELD OF THE INVENTION

The present invention relates to fasteners and, more particularly, to fasteners having conforming conical seals that reduce electromagnetic signatures.

BACKGROUND OF THE INVENTION

Anisotropic resistive properties and elevated contact resistances directly affect current paths and resulting electric fields within electrically connected regions in aircraft sections joined by fasteners. These electrical irregularities also directly affect the aircraft's electromagnetic response to high-frequency waves. What is desired is a fastener that optimizes the electrical continuity around the fastener head by reducing the contact resistance levels and modifying the electro-mechanical geometry at the edges of the fastener.

SUMMARY OF THE INVENTION

In an embodiment, a fastener including a sleeve having an elongated portion having a first end and a second end opposite the first end, a head located at the first end of the elongated portion, and an internal threaded portion located at the second end of the elongated portion, the head including a bearing surface located on an underside thereof; a core bolt disposed within the sleeve and having a first end, a second end opposite the first end of the core bolt, a head located at the first end of the core bolt, and a shank portion having an external threaded portion located proximate to the second end of the core bolt, the threaded portion of the core bolt being engageable threadedly with the threaded portion of the sleeve; and a seal element attached to the sleeve and juxtaposed with the bearing surface of the head of the sleeve.

In an embodiment, the seal element is made of copper. In an embodiment, the seal element includes a sealing portion and a lip that extends angularly from the sealing portion. In an embodiment, the seal element includes a tubular portion extending axially from the sealing portion. In an embodiment, the sealing portion of the seal element includes a thickness in a range of about 5 microns to about 100 microns. In an embodiment, the fastener further includes an insert disposed within the sleeve and surrounding a portion of the core bolt. In an embodiment, the elongated portion of the sleeve includes a band annealed portion proximate to the insert. In an embodiment, the insert includes a tubular member having internal threads that are engageable threadedly with the threaded portion of the core bolt. In an embodiment, the insert includes a coil spring having a trapezoidal cross-section and coiled around and within the threaded portion of the core bolt. In an embodiment, the head of the core bolt includes a flush head. In an embodiment, the head of the sleeve is sized and shaped to receive the flush head of the core bolt. In an embodiment, the core bolt includes a second head attached removably to the head of the core bolt, the second head being adapted to be engaged by a fastener installation tool.

In another embodiment, in combination, a structure; and a fastener installed within the structure, the fastener including a sleeve having an elongated portion having a first end and a second end opposite the first end, a head located at the first end of the elongated portion, and an internal threaded portion located at the second end of the elongated portion, the head including a bearing surface located on an underside thereof; a core bolt disposed within the sleeve and having a first end, a second end opposite the first end of the core bolt, a head located at the first end of the core bolt, and a shank portion having an external threaded portion located proximate to the second end of the core bolt, the threaded portion of the core bolt being engageable threadedly with the threaded portion of the sleeve; and a seal element attached to the sleeve and juxtaposed with the bearing surface of the head of the sleeve.

In an embodiment, the seal element is made of copper. In an embodiment, the seal element includes a sealing portion and a lip that extends angularly from the sealing portion. In an embodiment, the seal element includes a tubular portion extending axially from the sealing portion. In an embodiment, the sealing portion of the seal element includes a thickness in a range of about 5 microns to about 100 microns. In an embodiment, the fastener further includes an insert disposed within the sleeve and surrounding a portion of the core bolt. In an embodiment, the elongated portion of the sleeve includes a band annealed portion proximate to the insert. In an embodiment, the insert includes a tubular member having internal threads that are engageable threadedly with the threaded portion of the core bolt. In an embodiment, the insert includes a coil spring having a trapezoidal cross-section and coiled around and within the threaded portion of the core bolt. In an embodiment, the head of the core bolt includes a flush head. In an embodiment, the head of the sleeve is sized and shaped to receive the flush head of the core bolt. In an embodiment, the core bolt includes a second head attached removably to the head of the core bolt, the second head being adapted to be engaged by a fastener installation tool.

In an embodiment, the structure includes a composite material. In an embodiment, the structure is substantially made from the composite material. In an embodiment, the structure is partially made from the composite material. In an embodiment, the structure includes a metallic material. In an embodiment, the metallic material is aluminum. In an embodiment, the structure is made substantially from the metallic material. In an embodiment, the structure is made partially from the metallic material. In an embodiment, the structure includes a metallic mesh on an outer surface of the structure, wherein when the fastener is in its installed position, the sealing element of the fastener is in direct physical and electrical contact with the metallic mesh. In an embodiment, the metallic mesh is made from copper and the seal element is made from copper.

In an embodiment, the fastener of the present invention includes a core bolt, a sleeve adapted to receive the core bolt, and a seal element attached to sleeve and juxtaposed with the bearing surface of the head of the sleeve. When the fastener is installed within a structure, the seal element conforms to the inherent micro-roughness between the head of the sleeve and the structure, thus reducing contact resistance around the head of the sleeve and resulting in optimized electrical intimacy between the fastener and the structure and, in turn, reducing the electromagnetic signature of the structure.

BRIEF DESCRIPTION OF THE DRAWINGS

FIGS. 12A and 12B are schematic illustrations of the fastener of FIG. 8 before and after a sanding/shaving step, respectively; and FIGS. 13 and 14 are photographs of the fastener of FIG. 8 without and with the seal element, respectively, installed in a structure having a copper mesh layer thereon.

DETAILED DESCRIPTION OF THE DRAWINGS

Figure 1:
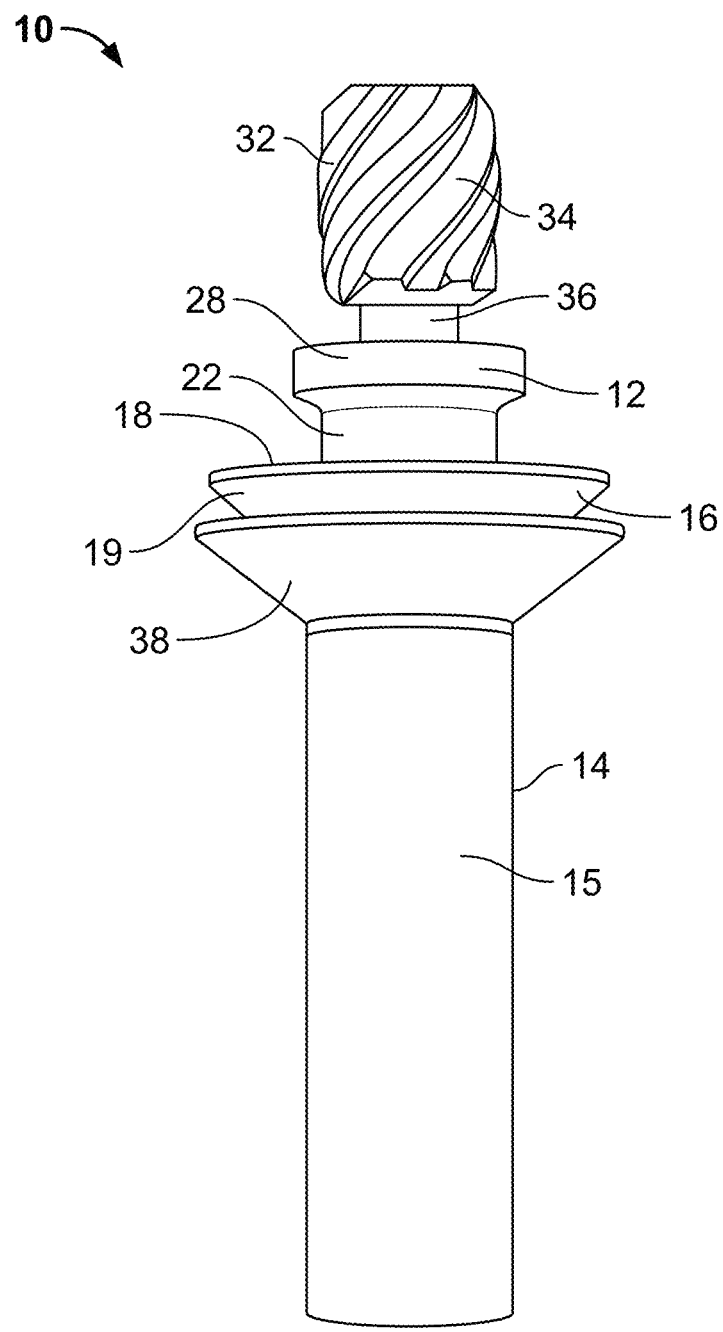
FIG. 1 is a side elevational view of a fastener in accordance with an embodiment of the present invention.
Figure 4:
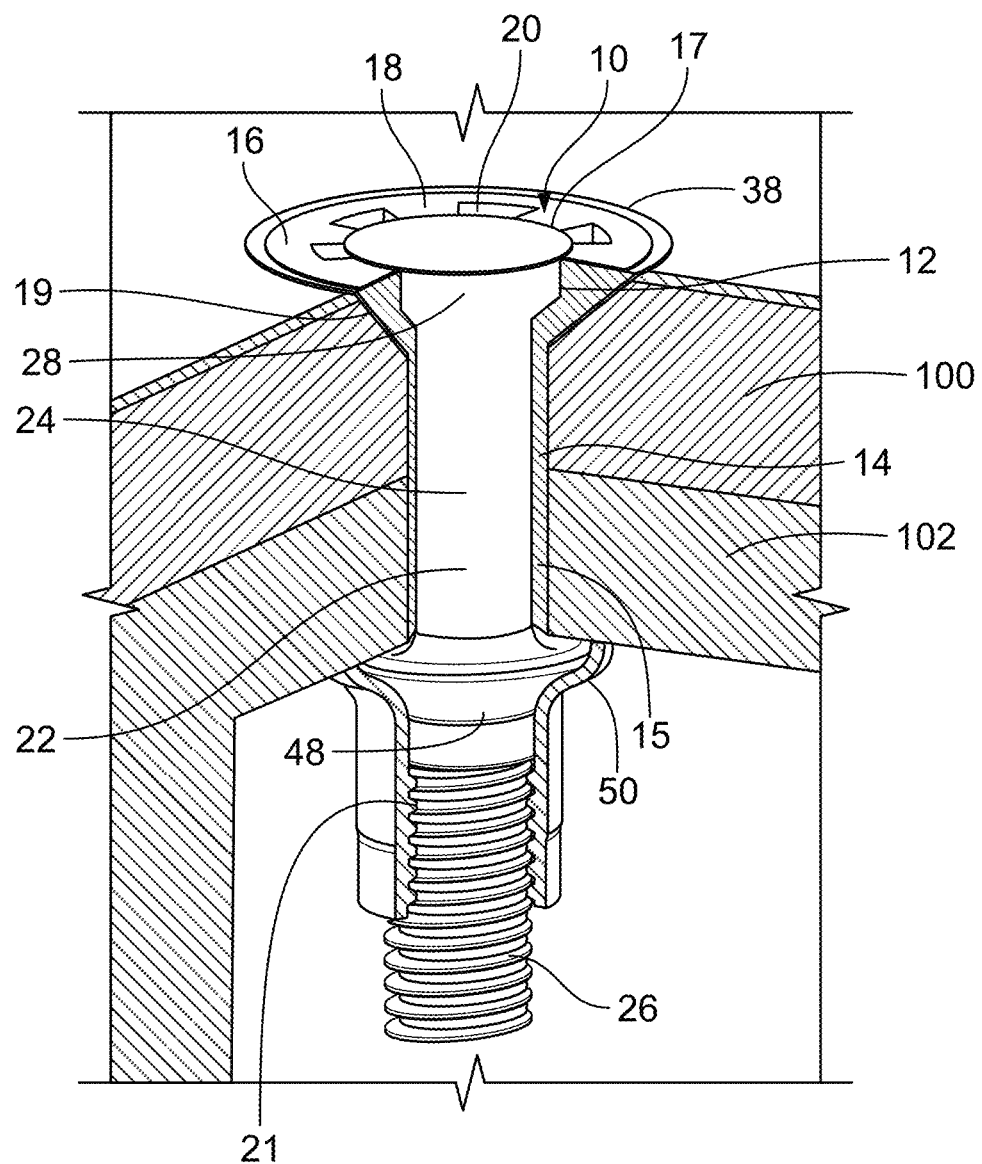
FIG. 4 is a partial cross-sectional perspective view of the fastener shown in FIG. 1, with the fastener installed in a plurality of work pieces.

Referring to FIGS. 1 and 4, in an embodiment, a fastener 10 is adapted to secure a plurality of work pieces 100, 102 to one another. In an embodiment, the fastener 10 is a blind bolt fastener. In an embodiment, the fastener 10 includes a core bolt 12 and a sleeve 14 that is sized and shaped to receive the core bolt 12. In an embodiment, the sleeve 14 includes an elongated portion 15 and a head 16 positioned at one end thereof. In an embodiment, the head 16 includes a first surface 18 having a central opening 17 that is sized and shaped to receive the core bolt 12, and a bearing surface 19 opposite the first surface 18 (i.e., the underside of the head 16). In an embodiment, the core bolt 12 includes a plurality of recesses 20 that is positioned circumferentially on the first surface 18 of the head 16 of the sleeve 14 and around the central opening 17 of the sleeve 14 (see FIG. 4). In an embodiment, the recesses 20 are adapted to be engaged by mating features located on one end of a fastener installation tool (not shown in the Figures). In an embodiment, the elongated portion 15 of the sleeve 14 includes an internal threaded portion 21 (see FIG. 4).

Still referring to FIGS. 1 and 4, in an embodiment, the core bolt 12 includes an elongated shank 22 having a first end and a second end opposite the first end, and which is sized and shaped to extend through the sleeve 14. In an embodiment, the sleeve 14 is sized and shaped to be inserted within openings of the work pieces 100, 102. In an embodiment, the shank 22 of the core bolt 12 includes a smooth cylindrical portion 24 and a threaded portion 26 located at the second end of the shank 22. In an embodiment, the threaded portion 26 of the shank 22 includes a diameter that is less than a diameter of the smooth cylindrical portion 24 of the shank 22. In an embodiment, the threaded portion 26 of the core bolt 12 is adapted to engage threadedly the threaded portion 21 of the sleeve 14. In an embodiment, the core bolt 12 includes a first head 28 located at the first end of the shank 22 and adjacent to the smooth cylindrical portion 24. In an embodiment, the head 28 is frustoconical in shape. In an embodiment, adjacent to the head 28 and also forming a portion of the core bolt 12 is a frangible, second head 32 having splines or threads 34 (see FIG. 1) that are engageable by a suitable driver attached to an installation tool (not shown in the Figures). In an embodiment, the first and second heads 28, 32 are formed integrally. In an embodiment, intermediate the first and second heads 28, 32 is a breakneck groove or portion 36 that defines the weakest point of the core bolt 12 and is adapted to fracture in torsional shear in response to the rotational force applied to second head 32 after the fastener 10 has been set.

In certain embodiments, the core bolt 12 and the sleeve 14 are similar in structure and function to those corresponding elements disclosed in either (1) U.S. Pat. No. 7,308,842 to Hufnagl et al., issued on Dec. 18, 2007 to Huck International, Inc. and entitled Blind Fastener and Nose Assembly for Installation of the Blind Fastener, or (2) U.S. Patent Application Publication No. 2016/0215804 to Hufnagl et al., published on Jul. 28, 2016 in the name of Arconic Inc. entitled Blind Fasteners, the entireties of which are incorporated by reference herein and made a part hereof.

Figure 2:
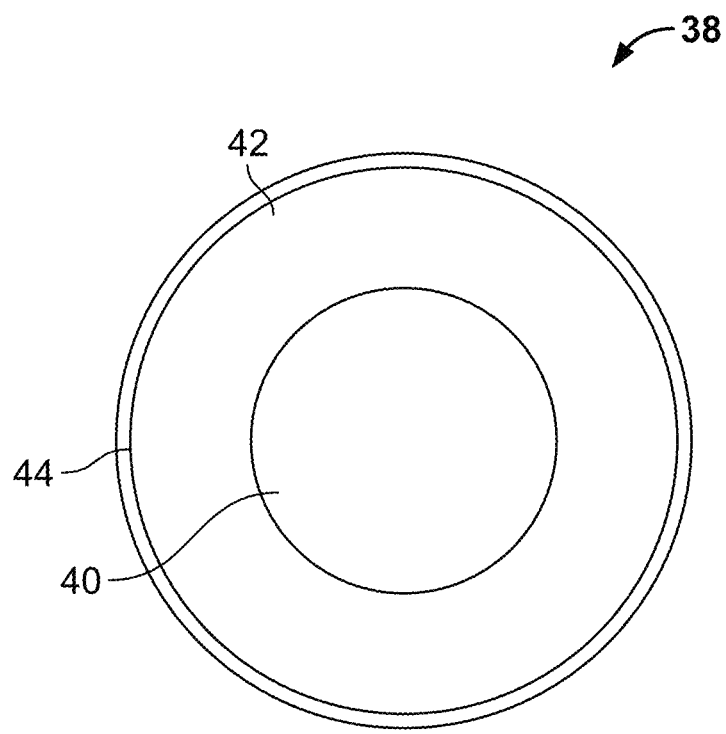
FIG. 2 is a top elevational view of an embodiment of a seal element employed by the fastener shown in FIG. 1.
Figure 3:
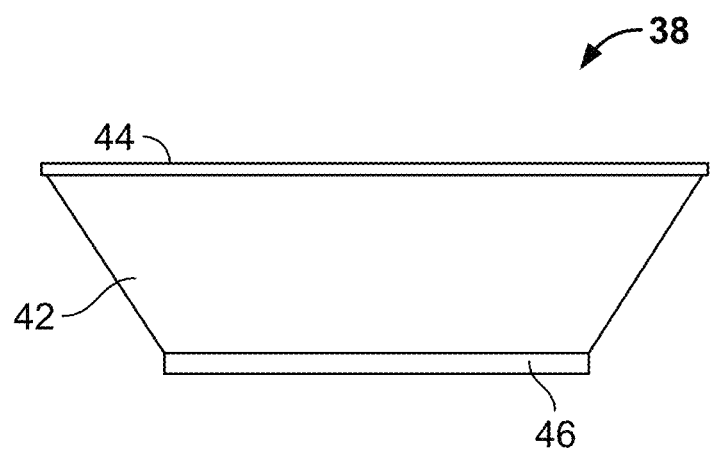
FIG. 3 is a side elevational view of the seal element shown in FIG. 2.

Referring to FIGS. 1 through 3, in an embodiment, a conforming seal element 38 is attached to the elongated portion 15 of the sleeve 14 and juxtaposed with the bearing surface 19 of the head 16 of the sleeve 14. In an embodiment, the seal element 38 is separate and distinct from the sleeve 14. In an embodiment, the seal element 38 is positioned within a hole of the work piece 100 and the sleeve 14 can then be inserted into and contact the seal element 38 during installation of the fastener 10. In an embodiment, the seal element 38 is frusto-conical in shape and includes a centrally located, circular-shaped aperture 40 that is sized and shaped to fit around the elongated portion 15 of the sleeve 14 and juxtaposed with the bearing surface 19 of the head 16 of the sleeve 14. In an embodiment, the seal element 38 includes a sealing portion 42. In an embodiment, the sealing portion 42 is frusto-conical in shape. In another embodiment, a lip 44 extends from one side of the sealing portion 42. In an embodiment, the lip 44 is angled upwardly from the sealing portion 42. In an embodiment, the lip 44 is angled obliquely from the sealing portion 42. In another embodiment, a tubular portion 46 extends axially from an opposite side of the sealing portion 42 (i.e., opposite the lip 44). In an embodiment, the tubular portion 46 includes a length that is very short relative to overall length of the seal element 38. In an embodiment, the seal element 38 is made from copper. In an embodiment, the sealing portion 42 of the seal element 38 has a thickness in a range of about 5 microns to about 100 microns.

In certain embodiments, the seal element 38 is identical or similar in structure and function to those corresponding elements disclosed in U.S. Patent Application Publication No. 2016/0281760 to Kamal et al., published on Sep. 29, 2016, entitled COATED FASTENERS WITH CONFORMING SEALS, the entirety of which is incorporated by reference herein and made a part hereof.

Referring to FIG. 4, in an embodiment, the fastener 10 includes an insert 48. In an embodiment, internal threads of the insert 48 receive and engage threadedly the threaded portion 26 of the core bolt 12. In an embodiment, the insert 48 is formed from a material that has lubricating properties. In an embodiment, the insert 48 includes copper. In other embodiments, the insert 48 may include other materials (e.g., other metals, plastics, etc.) that have frictional properties suitable to prevent thread galling and that are sufficiently malleable to aid in bulb formation of the sleeve 14. In certain embodiments, the insert 48 is similar in structure and function to those corresponding elements disclosed in the aforementioned U.S. Patent Application Publication No. 2016/0215804 to Hufnagl, the entirety of which is incorporated by reference herein and made a part hereof. In an embodiment, the elongated portion 15 of the sleeve 14 includes a band annealed portion to facilitate bulb formation of the sleeve 14. In an embodiment, the band annealed portion is located proximate to the insert 48. In an embodiment, the fastener 10 does not include the insert 48 and the band annealed portion facilitates bulb formation of the sleeve 14.

In an embodiment, a rotary installation tool having a nose assembly (not shown in the Figures) is provided to set the fastener 10. In an embodiment, the splines or threads 34 of the second head 32 of the core bolt 12 are engaged with complementary splines or threads of a driver of the tool (not shown in the Figures). As indicated above, the recesses 20 are adapted to be engaged by mating features positioned on one end of the fastener installation tool.

Rotation of the core bolt 12 with respect to the sleeve 14 compresses the insert 48. The insert 48 deforms outwardly (i.e., away from the core bolt 12) and the sleeve 14 deforms correspondingly. Such deformation of the insert 48 and the sleeve 14 causes the formation of a bulb 50 (see FIG. 4). The work pieces 100, 102 are secured between the bulb 50 on the blind side of the work piece 102 and the head 16 of the sleeve 14 on the side of the work piece 100 that is accessible by the installation tool. During installation, a torsional load builds up in the core bolt 12 and the break neck groove or portion 36 will fracture in torsional or rotational shear and the second head 32 will break off at the breakneck groove 36, as shown, and the first head 28 of the core bolt 12 will be flush, or substantially flush, with the head 16 of the sleeve 14, and, particularly, the first surface 18 of the head 16, as shown in FIG. 4. In addition, the seal element 38 is adapted to maximize the true area of contact between the fastener 10 (e.g., the bearing surface 19 of the head 16 of the sleeve 14) and the work piece 100 with minimum mechanical load. In an embodiment, the work pieces 100, 102 include a composite material. In another embodiment, the work pieces 100, 102 are substantially made from a composite material. In another embodiment, the work pieces 100, 102 are partially made from a composite material. In another embodiment, the work pieces 100, 102 include a metallic material. In an embodiment, the metallic material is aluminum. In another embodiment, the work pieces 100, 102 are made substantially from a metallic material. In another embodiment, the work pieces 100, 102 are made partially from a metallic material.

In an embodiment, the conforming seal element 38 includes a multi-layer construction with a relatively soft, yet highly electrically conductive base layer, which provides macroscopic conformity, and a softer top layer, which provides microscopic conformity.

Figure 5:
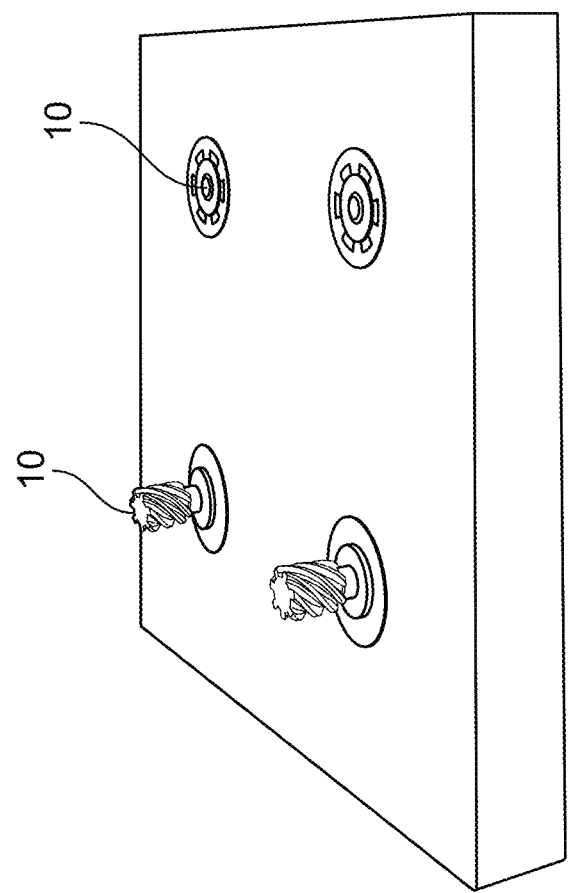
FIG. 5 is a top perspective view of a plurality of the fasteners shown in FIG. 1, with some being shown in a preinstalled position within a work piece, and some being shown in an installed position within the work piece.
Figure 6:
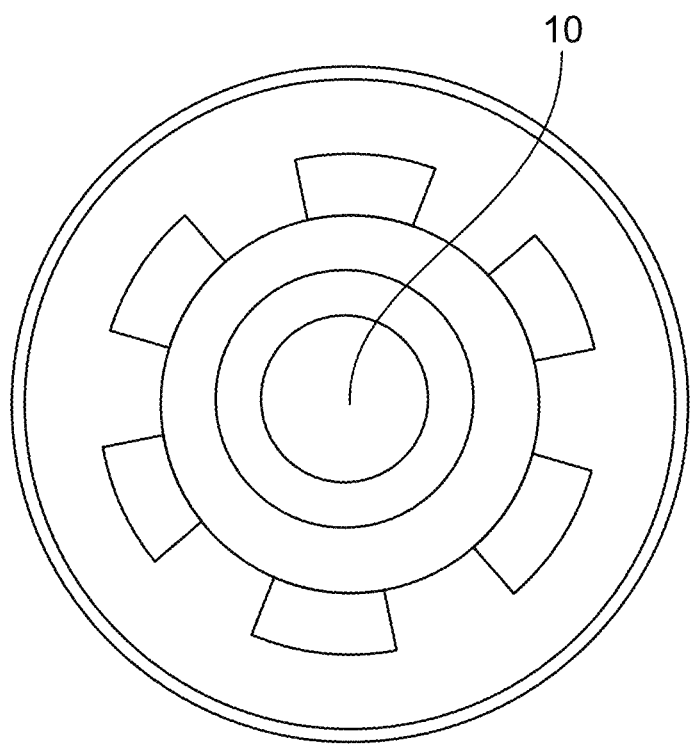
FIG. 6 is a top plan view of the fastener shown in FIG. 1 as installed.

FIG. 5 shows a plurality of the fasteners 10, two of which are shown on the left in a preinstalled position within a work piece, and two of which are shown on the right in an installed position within the work piece. FIG. 6 shows the fastener 10 installed within a work piece and after a shaving step to smooth the remnants of the broken off portion 36 as a result of removal of the head 32.

Figure 7:
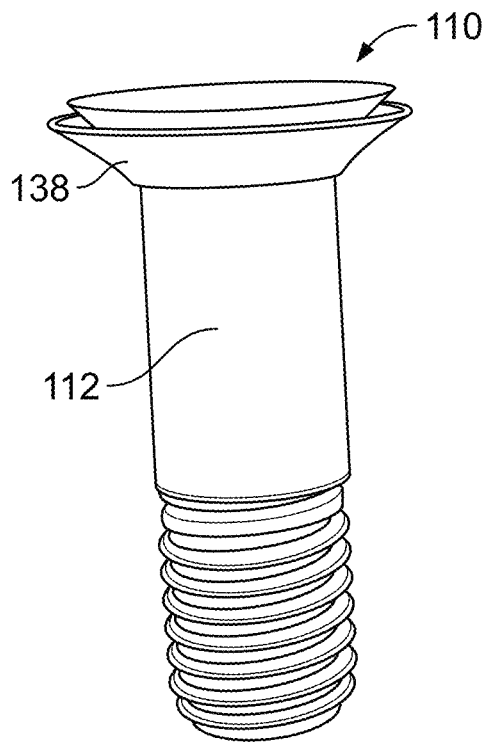
FIG. 7 is a side elevational view of another embodiment of a fastener having a conforming seal element.
Figure 8:
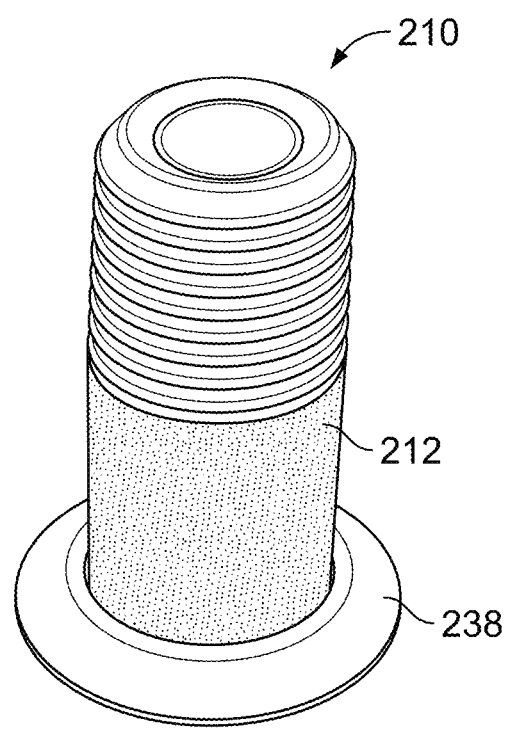
FIG. 8 is a side elevational view of another embodiment of a fastener having a pin member with selected surfaces coated with a material, and a seal element assembled with the pin member.

FIG. 7 shows an embodiment of a fastener 110 having a pin member 112 with a conforming seal element 138. Further details of the structure of the pin member 112 and the seal element 138 are described in aforementioned and incorporated U.S. Patent Application Publication No. 2016/0281760 to Kamal et al. FIG. 8 shows another embodiment of a fastener 210 having a pin member 212 with selected surfaces coated with a material, and a seal element 238 assembled with the pin member 212. Further details of the structure of the pin member 212 and the seal element 238 in aforementioned and incorporated U.S. Patent Application Publication No. 2016/0281760 to Kamal et al.

Figure 9:
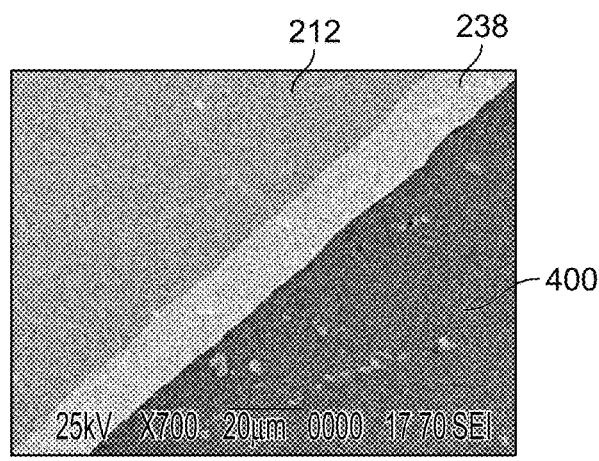
FIGS. 9 through 11 are micro-photographs that illustrate the fastener shown in FIG. 8 installed in a structure.
Figure 10:
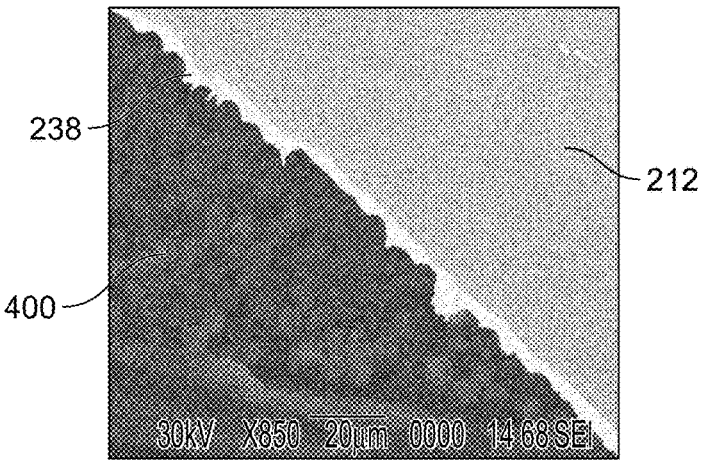
Figure 11:
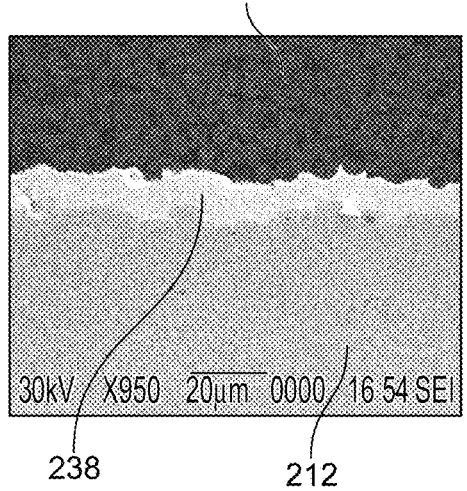

FIGS. 9 through 11 are micro-photographs that illustrate the pin member 212 and the seal element 238 shown in FIG. 8 installed in a structure 400. The seal element 238 is adapted to maximize the true area of contact between the fastener (e.g., the bearing surface of the head of the pin member 212) and the structure 400 with minimum mechanical load.

FIGS. 12A and 12B are schematic illustrations of the installed fastener 210 of FIG. 8 before and after a sanding step, respectively, while FIGS. 13 and 14 are photographs of the installed fastener 210 of FIG. 8 without and with the seal element 238, respectively, in a structure with copper mesh 500. The method of installation, including the sanding steps, is discussed in further detail in aforementioned and incorporated U.S. Patent Application Publication No. 2016/0281760 to Kamal et al.

In an embodiment, the fasteners 10, 110, 210 optimize the electrical continuity and modify the electromagnetic response between the fasteners 10, 110, 210 and their associated surrounding structure. Improved current transport in addition to electric field mitigation of the fasteners 10, 110, 210 is directly responsible for their performance in lightning strike protection applications. The fasteners 10, 110, 210 are adaptable to specific fastening requirements for both internal and external aircraft applications. Furthermore, the multilayer metal design of the seal elements 38, 138, 238 and geometrical features of the fasteners 10, 110, 210 can be adjusted to optimize specific physics requirements.

Although the fasteners 10, 110, 210 are adapted for use and installation in both metal and composite aircraft structures, their conforming nature enables direct connection between the fasteners 10, 110, 210 and the expanded metal mesh 500 frequently used on the outer surface of composites for lightning strike protection (see FIGS. 12A and 12B and 13 and 14). Since fastener holes have substantial geometrical variation and the axial position of the fasteners 10, 110, 210 are sometimes sub-flush, using the seal elements 38, 138, 238 enables continuous electrical contact with the mesh strand contact points of the mesh 500 around the perimeter of the fastener head (e.g., sleeve head and the pin head, respectively). The enhanced mesh/material connection optimizes the current load distribution of the mesh strands which increases the strand fusing lifetime and increases the amount of current or electromagnetic wave energy efficiently transported across the outer skin surface. These characteristics have tremendous advantages for numerous aerospace applications since the low weight of the fasteners 10, 110, 210 makes them very desirable and enables aircraft manufacturers to achieve a better weight/performance ratio by using lower density meshes (lower aircraft weight) while improving the impedance characteristics of the aircraft surface.

In an embodiment, the changes in the physics of the fastener interface region results in improved electromagnetic properties. In an embodiment, the fasteners 10, 110, 210 minimize gap regions typically formed between the structure and edges/surfaces of the fastener head. The exceptional electrical continuity and reduction of surface irregularities improve the electromagnetic wave response with minimal need of radar absorbing materials (RAM) to ensure a homogeneous low-scattering electrical network. For example, with respect to the fastener 10, the deformable insert 48 forces the sleeve 14 to expand radially to form the bulb 50, thus establishing electrical connection with the inner surface of the structure. In an embodiment, the electrical contact of the fastener 10 effectively reduces the potential difference between the fastener head 16 and the region of contact between the bulb 50 and the structure (e.g., workpiece 102), which not only improves the current and electric field response, but provides a direct path for continuous propagation of electromagnetic waves. Thus, the fastener 10 significantly reduces the internal electrical discontinuities and minimizes floating surfaces and edges within the fastener 10, thus, reducing electromagnetic wave scattering (reduced radar cross section) and minimizing the electromagnetic signature.

Also, the fastener 10 creates an intimate electrical bond that penetrates deeper into the structure along the entire surface under the fastener head (e.g., the head 16 of the sleeve 14 and the seal element 38), which again reduces the potential for electromagnetic wave scattering form subsurface discontinuities. The integrity of the electrical path is exceptional using the fastener 10 and its uniform surface characteristics result in an enhanced aerodynamic paint surface which is highly desired.

It should be understood that the embodiments described herein are merely exemplary and that a person skilled in the art may make many variations and modifications without departing from the spirit and scope of the invention. All such variations and modifications are intended to be included within the scope of the invention as exemplified by the appended claims.

What is claimed is:

1. A fastener, comprising:
   a sleeve having an elongated portion having a first end and a second end opposite the first end, a head located at the first end of the elongated portion, and an internal threaded portion located at the second end of the elongated portion, the head including a bearing surface located on an underside thereof;
   a core bolt disposed within the sleeve and having a first end, a second end opposite the first end of the core bolt, a head located at the first end of the core bolt, and a shank portion having an external threaded portion located proximate to the second end of the core bolt, the threaded portion of the core bolt being engageable threadedly with the threaded portion of the sleeve; and
   a seal element attached to the sleeve and juxtaposed with the bearing surface of the head of the sleeve, the seal element includes a sealing portion and a lip that extends angularly from the sealing portion, and the seal element includes a tubular portion extending axially from the sealing portion.

2. The fastener of claim 1, wherein the seal element is made of copper.

3. The fastener of claim 1, wherein the sealing portion of the seal element includes a thickness in a range of about 5 microns to about 100 microns.

4. The fastener of claim 1, further comprising an insert disposed within the sleeve and surrounding a portion of the core bolt.

5. The fastener of claim 4, wherein the elongated portion of the sleeve includes a band annealed portion proximate to the insert.

6. The fastener of claim 4, wherein the insert includes a tubular member having internal threads that are engageable threadedly with the threaded portion of the core bolt.

7. The fastener of claim 4, wherein the insert includes a coil spring having a trapezoidal cross-section and coiled around and within the threaded portion of the core bolt.

8. The fastener of claim 1, wherein the head of the core bolt includes a flush head.

9. The fastener of claim 8, wherein the head of the sleeve is sized and shaped to receive the flush head of the core bolt.

10. The fastener of claim 1, wherein the core bolt includes a second head attached removably to the head of the core bolt, the second head being adapted to be engaged by a fastener installation tool.

11. In combination,
    a structure; and
    a fastener installed within the structure, the fastener including a sleeve having an elongated portion having a first end and a second end opposite the first end, a head located at the first end of the elongated portion, and an internal threaded portion located at the second end of the elongated portion, the head including a bearing surface located on an underside thereof;
    a core bolt disposed within the sleeve and having a first end, a second end opposite the first end of the core bolt, a head located at the first end of the core bolt, and a shank portion having an external threaded portion located proximate to the second end of the core bolt, the threaded portion of the core bolt being engageable threadedly with the threaded portion of the sleeve; and
    a seal element attached to the sleeve and juxtaposed with the bearing surface of the head of the sleeve, the seal element includes a sealing portion and a lip that extends angularly from the sealing portion, and the seal element includes a tubular portion extending axially from the sealing portion.

12. The combination of claim 11, wherein the seal element is made of copper.

13. The combination of claim 11, wherein the sealing portion of the seal element includes a thickness in a range of about 5 microns to about 100 microns.

14. The combination of claim 11, wherein the structure includes a metallic mesh on an outer surface of the structure, wherein when the fastener is in its installed position, the sealing element of the fastener is in direct physical and electrical contact with the metallic mesh.

15. The combination of claim 14, wherein the metallic mesh is made from copper and the seal element is made from copper.

16. The combination of claim 11, further comprising an insert disposed within the sleeve and surrounding a portion of the core bolt.

17. The combination of claim 16, wherein the elongated portion of the sleeve includes a band annealed portion proximate to the insert.

18. The combination of claim 16, wherein the insert includes a tubular member having internal threads that are engageable threadedly with the threaded portion of the core bolt.

19. The combination of claim 16, wherein the insert includes a coil spring having a trapezoidal cross-section and coiled around and within the threaded portion of the core bolt.

20. The combination of claim 11, wherein the head of the core bolt includes a flush head.

21. The combination of claim 20, wherein the head of the sleeve is sized and shaped to receive the flush head of the core bolt.

22. The combination of claim 11, wherein the core bolt includes a second head attached removably to the head of the core bolt, the second head being adapted to be engaged by a fastener installation tool.

23. The combination of claim 11, wherein the structure includes a composite material.

24. The combination of claim 11, wherein the structure is substantially made from the composite material.

25. The combination of claim 11, wherein the structure is partially made from the composite material.

26. The combination of claim 11, wherein the structure includes a metallic material.

27. The combination of claim 26, wherein the metallic material is aluminum.

28. The combination of claim 26, wherein the structure is made substantially from the metallic material.

29. The combination of claim 26, wherein the structure is made partially from the metallic material.

\* \* \* \* \*